United States Patent [19]

Edgerton

[11] 4,003,485
[45] Jan. 18, 1977

[54] VEHICLE-TOP LOADER

[76] Inventor: Nelson Weeks Edgerton, 1112 Middle Road, Martinsville, N.J. 08836

[22] Filed: July 17, 1975

[21] Appl. No.: 596,733

[52] U.S. Cl. .......................... 214/450; 224/42.1 H
[51] Int. Cl.² ........................ B60P 3/10; B60R 9/04
[58] Field of Search ............... 214/450; 224/42.1 H

[56] References Cited

UNITED STATES PATENTS

| | | | |
|---|---|---|---|
| 2,551,351 | 5/1951 | Swenson | 214/450 |
| 2,573,187 | 10/1951 | Desilets | 224/42.1 H X |
| 2,828,035 | 3/1958 | Kuchinskie | 224/42.1 H |
| 3,186,569 | 6/1965 | Roux | 214/450 |
| 3,460,694 | 8/1969 | Simms | 214/450 |
| 3,480,166 | 11/1969 | Abbott | 214/450 |
| 3,866,776 | 2/1975 | Partyka | 214/450 |
| 3,894,643 | 7/1975 | Wilson | 214/450 |

*Primary Examiner*—L. J. Paperner

[57] ABSTRACT

A carriage rests on a vehicle-top rack when travelling. For loading and unloading it is moved across the rack and pivoted downward to a slant position alongside the vehicle. The upper portion of the carriage is adapted to support the intended load, such as a boat, canoe, luggage, etc. An extendable lever is employed to aid in lifting the loaded carrier to vehicle-top height. When the load is a sailboat the mast serves as the lever.

2 Claims, 9 Drawing Figures

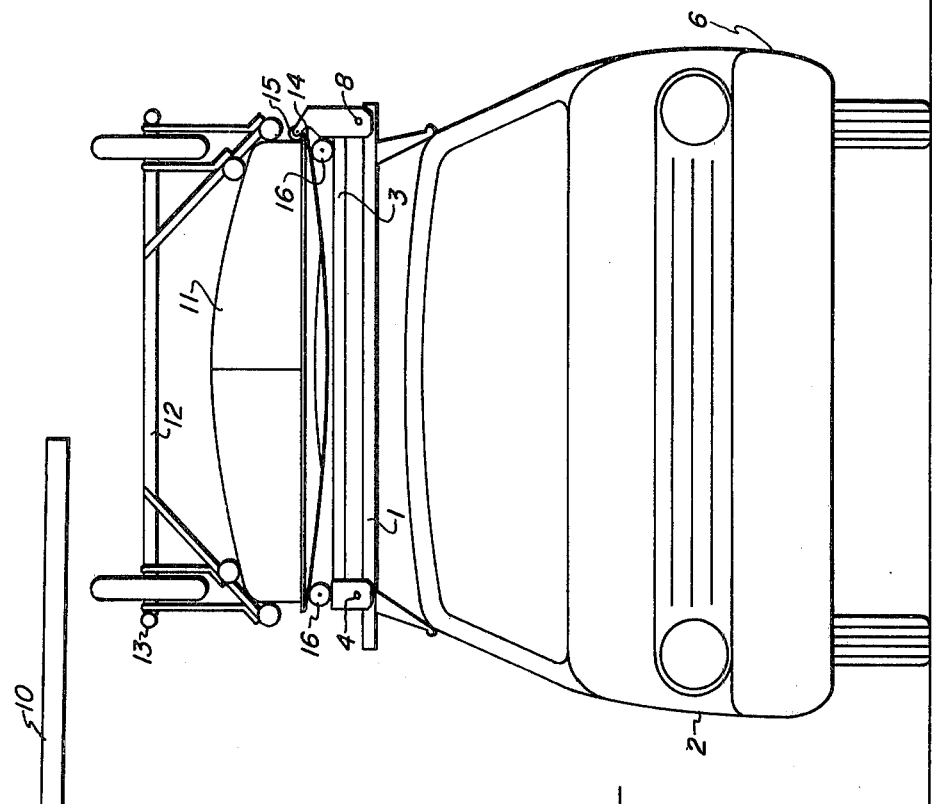
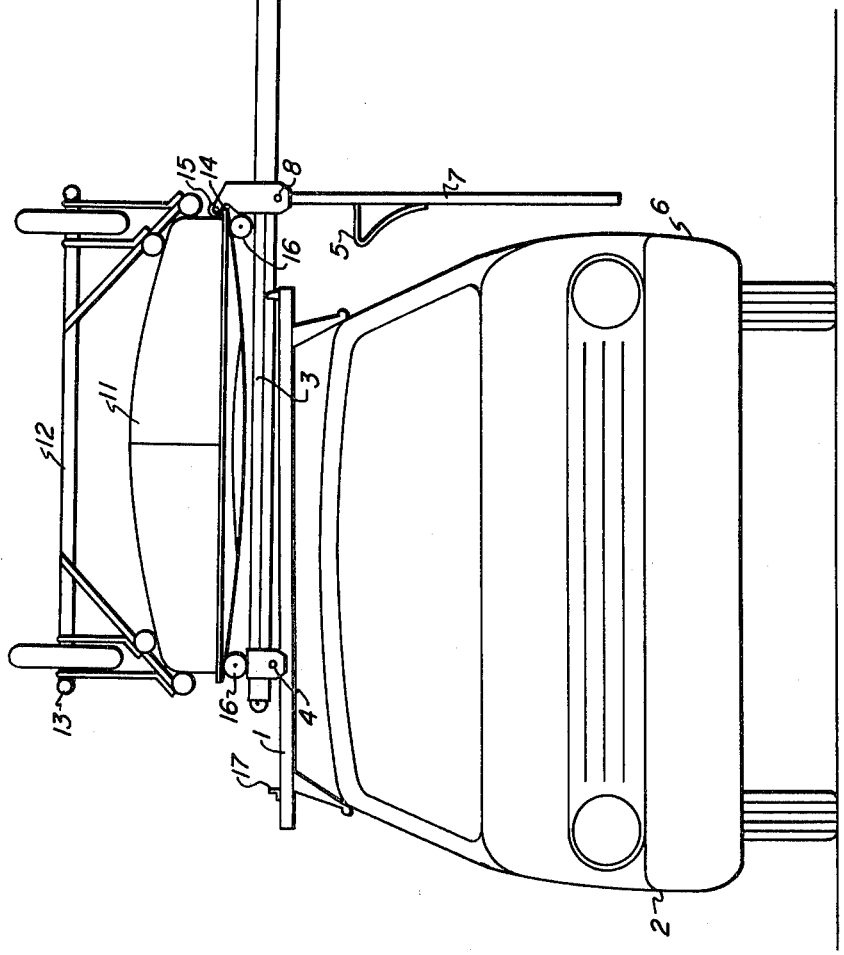
FIG. 4
FIG. 3

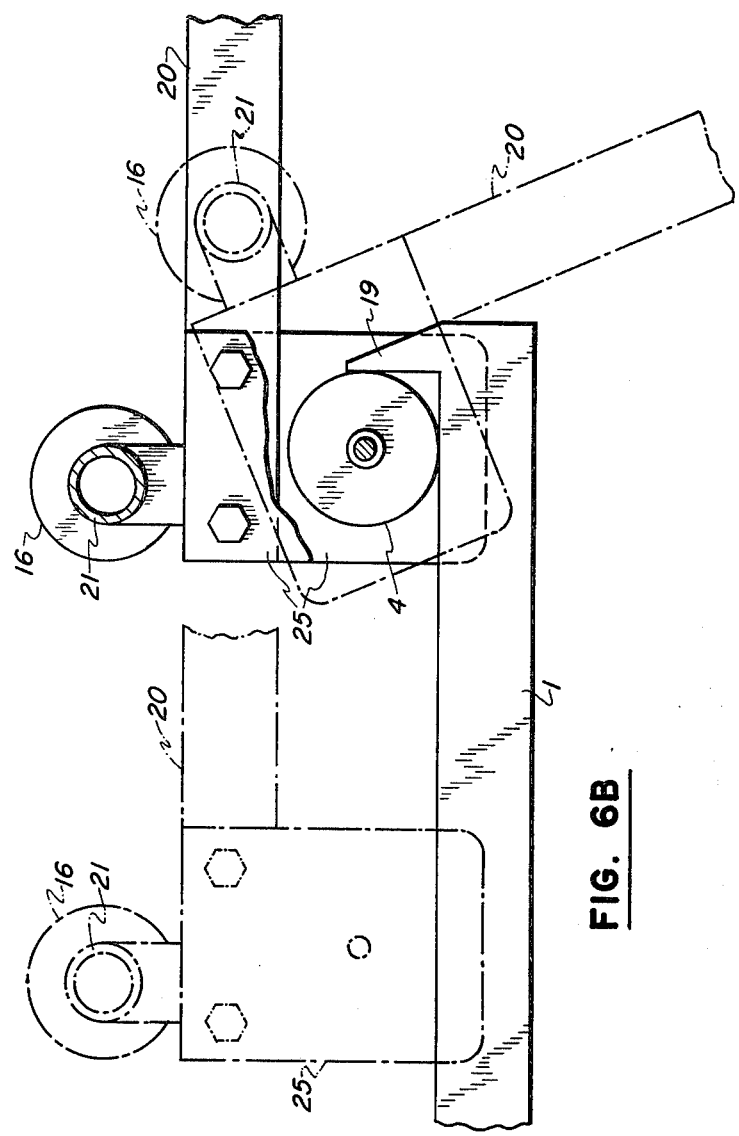
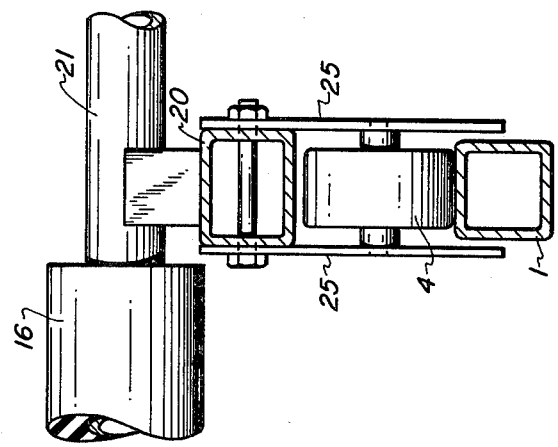
FIG. 6B
FIG. 6A

VEHICLE-TOP LOADER

Vehicle-top carriers are in common use but heretofore none have provided a simple and effective way for a single person, without assistance, to lift a heavy and bulky load to vehicle-top height and to place it on the carrier. An object of the invention is to provide such a loader and carrier.

The prior art has in general taken three approaches to the problem of lifting the load to the height of the top of the vehicle: A system of winches and cables, manually pushing the load up an incline formed by side rails, or rotating the load to the necessary height and then rolling it to the travelling position. All of these approaches suffer from significant drawbacks. Winch and cable systems actually require unduly sturdy mountings and structure to work well in practice. Manually pushing a heavy load up an incline is difficult unless the slope is made small by the use of long side rails; these long rails then present a storage problem. Rotating the load is similarly difficult because of the lack of adequate mechanical advantage. An object of the invention is to provide a loader and carrier which is free of these drawbacks.

A further difficulty with the load on the rotating carriage has been the support at the lower end. For the lower end to rest on the ground it must be wider than most vehicle tops yielding an undesirable overhang. When the lower end rests against the vehicle body there is risk of marring the vehicle by denting the side panels. A further object of the invention is to provide support for the lower end of the carriage without damage to the vehicle.

The invention will be more fully understood and additional objects and advantages become apparent by reference to the following drawings and description of the use of the invention when the load to be carried is a sailboat.

FIGS. 1 through 4 show the successive stages in loading a sailboat onto the top of a vehicle.

FIGS. 6A and 6B are side and front views, respectively, of the roller pivot which allows the carriage to move on the car-top rack.

Figure 1:
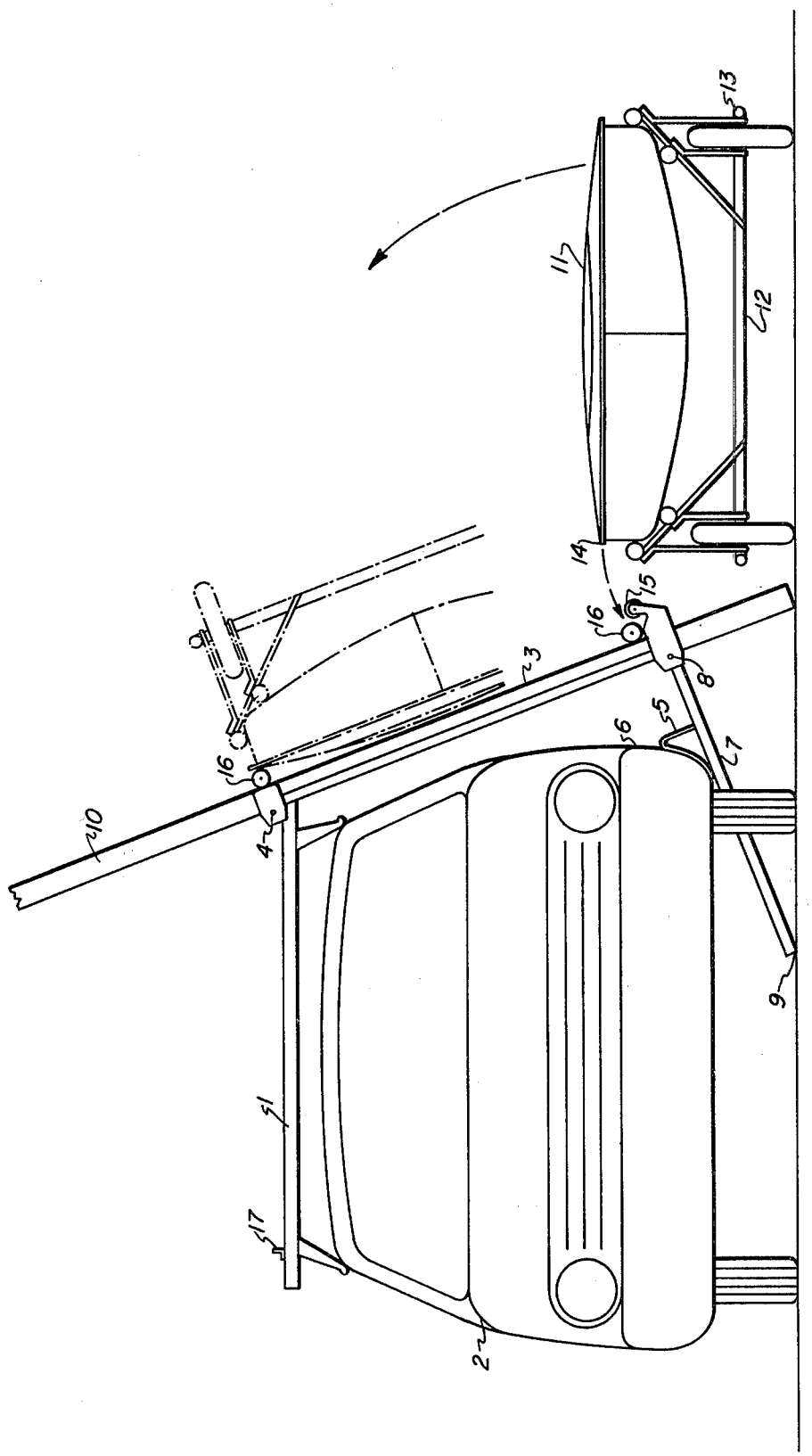

In accordance with the present invention there is provided a carrier rack having a pair of transverse bars 1. The rack is mounted on car 2. Carriage 3 has rollers 4 which engage a stop at each end of the transverse bars. In operation the carriage is swung to the slant position for loading, shown in FIG. 1, where most of the weight is supported by the rollers. In this position, struts 5 bear on vehicle splash panel 6 and prevent further rotation toward the vehicle. Each strut is attached to a leg 7 which is pivotally attached to the carriage by pins 8. In this loading position leg end 9 is placed beneath the vehicle in contact with the ground beneath the vehicle. The upward reaction of the ground on leg end 9 prevents strut 5 from sliding downward under the curved underside of splash panel 6; the net effect being to hold the carriage firmly in the loading position while the boat is placed thereon.

Mast 10 is slid into loops 22 provided on the underside of the carriage with the lower end of the mast resting on the ground. The boat 11, on wheeled dolly 12, is rolled into a position adjacent to the carriage, as shown in FIG. 1.

Lifting bar 13, located on the side of the dolly away from the car, is grasped and raised bringing boat gunnel lip 14 into engagement with boat pivot 15. Continued lifting rotates the boat supports 16 as shown in phantom in FIG. 1.

The lower end of the mast is grasped and lifted, rotating the carriage and boat upward with rollers 4 acting as pivots. Simultaneously the legs withdraw from under the car and swing of their own weight to a vertical position. Lifting is ceased and the mast is lowered slightly so that the legs support the carriage in the intermediate position shown in FIG. 2.

The mast is slid outward in a direction away from the car so that its full length is available as a lever. The mast is again lifted, raising the boat to the level of the top of the vehicle, and then the mast is pushed toward the vehicle. Friction effectively locks the carriage to the mast and the carriage rolls on transverse bars 1 to the position shown in FIG. 3 where the mast is lowered so the weight of the carriage and boat is transferred to the rack. Legs 7 are removed from pins 8. The mast is again lifted and pushed toward the vehicle until the rollers contact stops 17 on the far side of the rack. The mast is lowered so that the carriage rests on the transverse bars and is confined by stops 19 on the near side of the rack. The mast is removed and stored. The boat is now in the loaded position of FIG. 4. Suitable lashings secure the boat to the vehicle, ready for travel.

Figure 2:
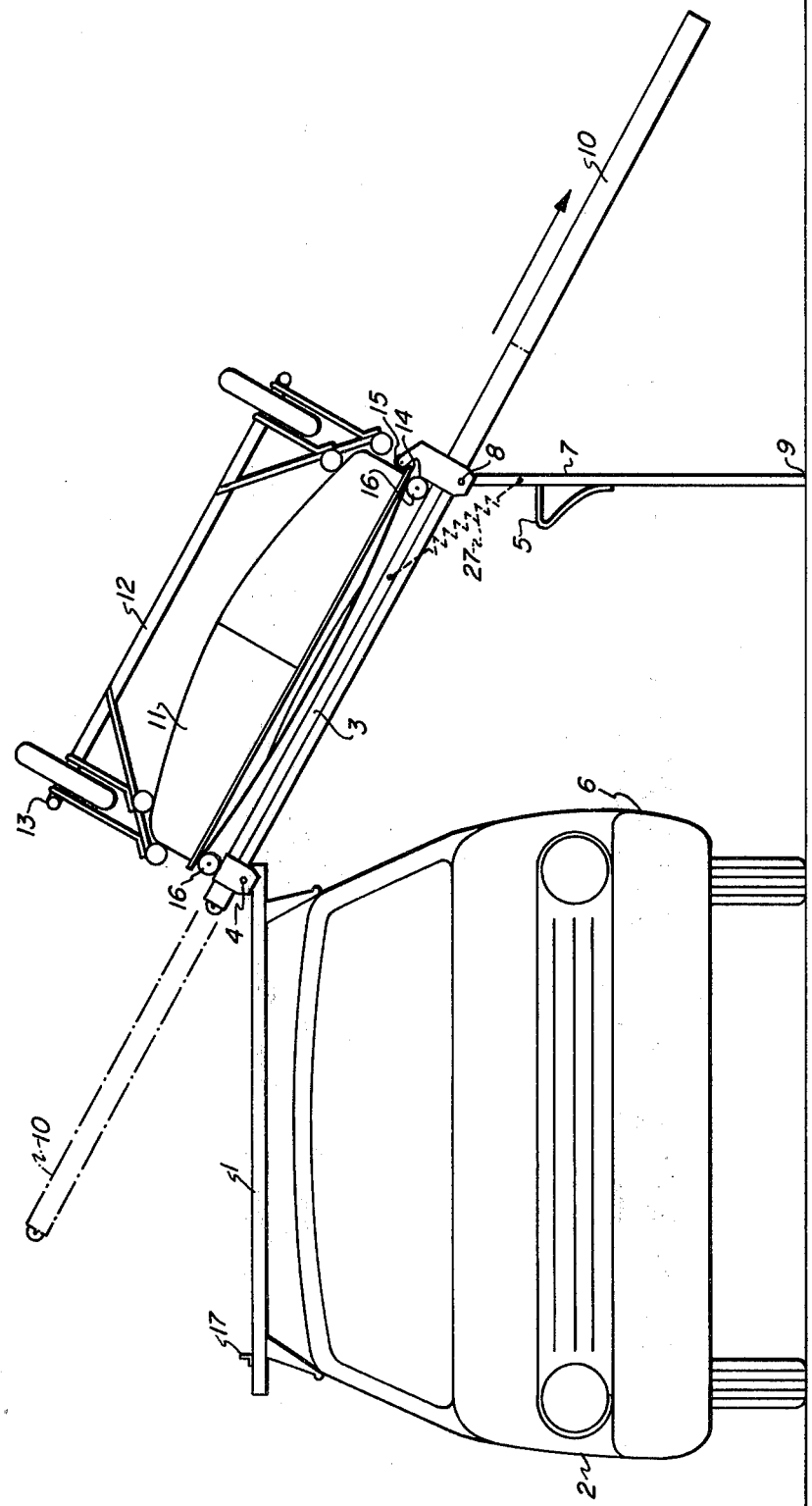

The boat is unloaded by going through the above steps in reverse order except that, when the boat is in the intermediate position of FIG. 2, springs 27 are attached to the legs and carriage. When the mast is lifted, the springs raise the legs so that they slide under the car as the mast and carriage are rotated downward.

Figure 5:
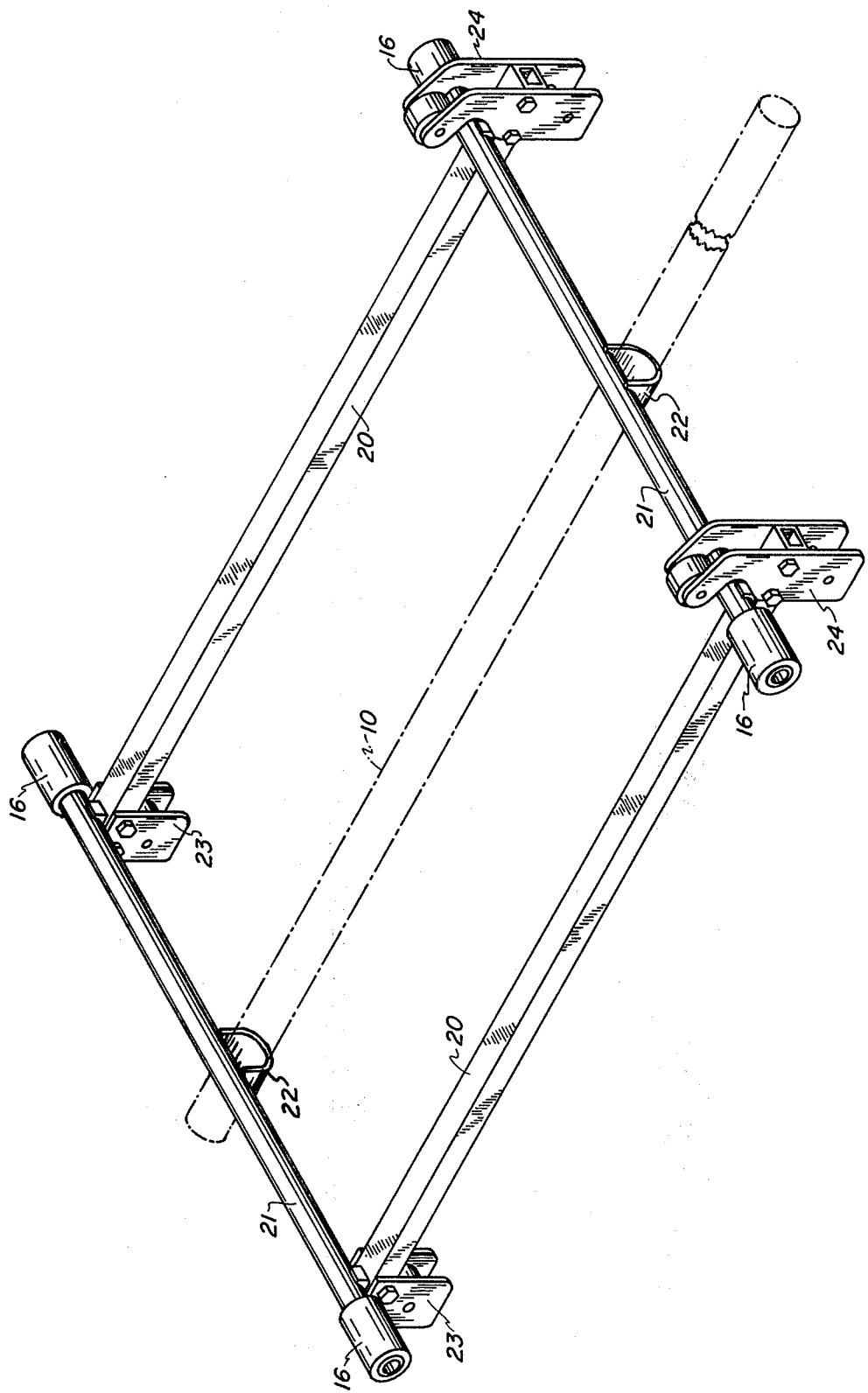
FIG. 5 shows the carriage on which the load is placed.

Carriage 3 is shown in FIG. 5 to comprise a rectangular frame made up of lateral members 20 and longitudinal members 21. The longitudinal members carry boat supported 16, suitably shaped and padded to bear the weight of the boat, and mast support loops 22. The lateral members have roller assembly 23 attached at one end and boat pivot assembly 24 at the other.

Roller assembly 23, shown in FIG. 6, comprises roller 4 mounted between roller sideplates 25 which are extended to overlap transverse bars 1 thus serving to guide the roller along the bar. Roller 4 also serves as a pivot for rotation of the carriage to the slant position when rolling motion is terminated by stops 19.

Figure 7B:
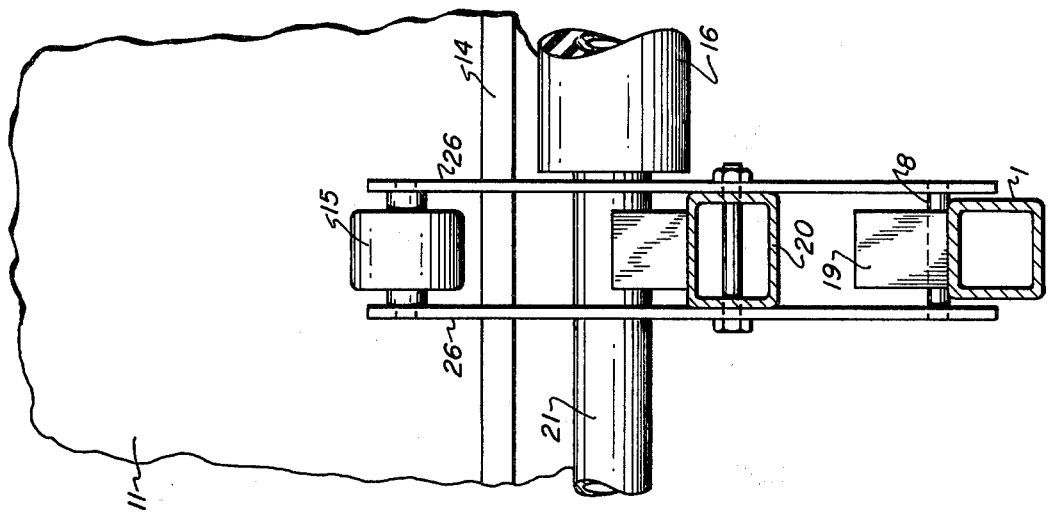
FIGS. 7A and 7B are front and side views, respectively, of the pivot which first receives the boat and shows the associated part described subsequently.
Figure 7A:
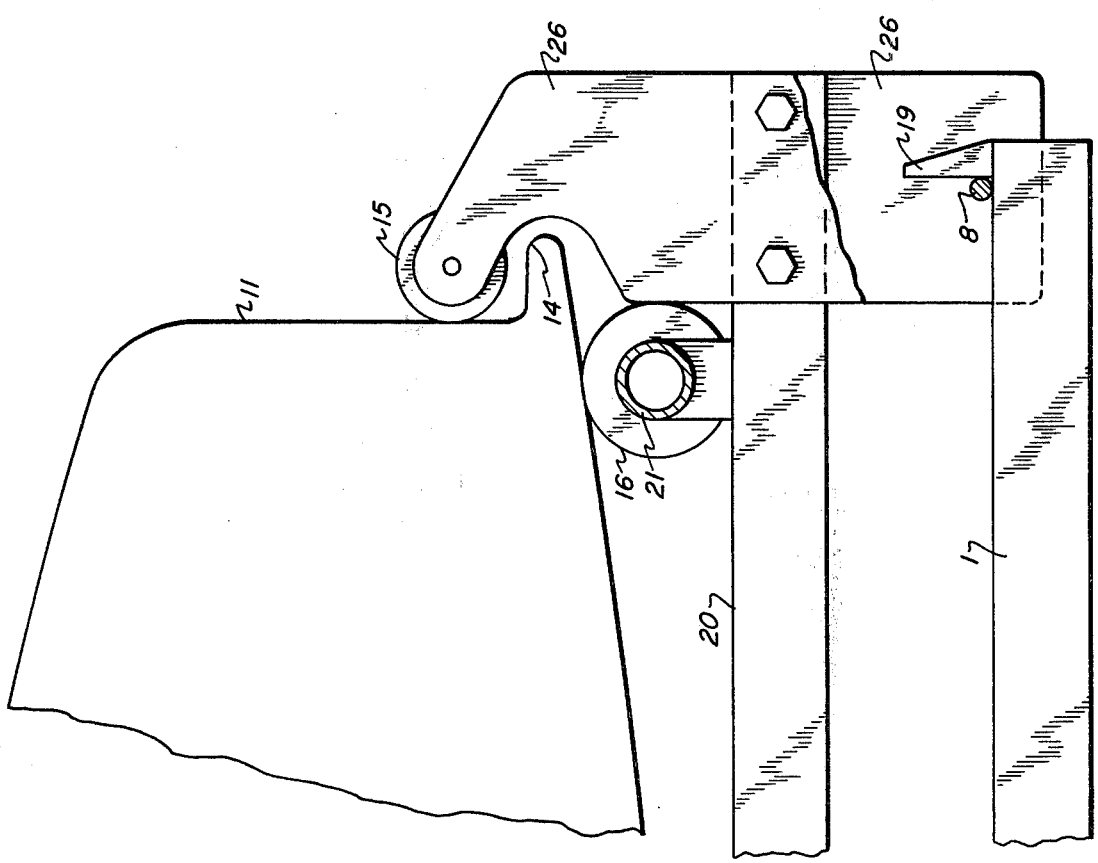

Boat pivot assembly 24, shown in FIG. 7, comprises boat pivot 15 mounted between pivot side plates 26, which also overlap transverse bars 1 to locate the carriage on the rack when in the travelling position, and pin 8 to which leg 7 is attached. Pin 8 bears against stop 19 and prevents sidewise motion of the carriage during travel.

I claim:
1. A vehicle-top loader and carrier comprising:
   a rack adapted to be supported on the top of said vehicle;
   a carriage adapted to cooperate with said rack to enable rotation from an inclined loading position alongside said vehicle to the level of said rack and subsequent horizontal movement across said rack to the travelling position above said vehicle, said carriage being adapted to support a boat; and a lever comprising the mast of said boat extendably attached to said carriage to enable withdrawal of said lever in a direction away from said vehicle thereby providing increased leverage to raise said carriage to said rack level.

2. A vehicle-top loader and carrier comprising:

a rack adapted to be supported on the top of said vehicle;

a carriage adapted to cooperate with said rack to enable rotation from an inclined loading position alongside said vehicle to the level of said rack and subsequent horizontal movement across said rack to the travelling position above said vehicle;

a lever extendably attached to said carriage to enable withdrawal of said lever in a direction away from said vehicle thereby providing increased leverage to raise said carriage to said rack level;

at least one strut adapted to cooperate with the side of said vehicle;

at least one leg pivotally attached to one side of said carriage, said strut being attached to said leg;

a lower end of said leg extends underneath said vehicle when said carriage is in said loading position whereby the reaction of said lower end with the surface on which said vehicle is standing forces said strut upward into contact with the splash panel of said vehicle thereby supporting the lower side of said carriage.

* * * * *